United States Patent
Coupal et al.

(10) Patent No.: US 10,434,449 B1
(45) Date of Patent: Oct. 8, 2019

(54) FILTER RETAINING MECHANISM WITH FILTER/PRE-FILTER CLIP

(71) Applicants: Alan Coupal, Dracut, MA (US); Mitra Nathasingh, Rockland, MA (US)

(72) Inventors: Alan Coupal, Dracut, MA (US); Mitra Nathasingh, Rockland, MA (US)

(*) Notice: Subject to any disclaimer, the term of this patent is extended or adjusted under 35 U.S.C. 154(b) by 156 days.

(21) Appl. No.: 15/659,907

(22) Filed: Jul. 26, 2017

(51) Int. Cl.
*B01D 59/50* (2006.01)
*B01D 46/00* (2006.01)

(52) U.S. Cl.
CPC ....... *B01D 46/001* (2013.01); *B01D 46/0013* (2013.01); *B01D 46/0021* (2013.01); *B01D 2265/028* (2013.01)

(58) Field of Classification Search
CPC .. B01D 46/002; B01D 46/0005; B01D 59/50; B01D 2265/028; B01D 46/001; B01D 46/0023; B01D 46/0013; Y10S 55/31
USPC ......... 55/483, 484, 493, 490, 495, 496, 501, 55/502, 507, 511, DIG. 31
See application file for complete search history.

(56) References Cited

U.S. PATENT DOCUMENTS

| | | |
|---|---|---|
| 2,771,155 A | 11/1956 | Palmore |
| 3,250,063 A | 5/1966 | Andrews |
| 3,525,200 A | 8/1970 | Smith |
| 3,966,163 A | 6/1976 | Getzin |
| 3,999,969 A | 12/1976 | Shuler |
| 4,217,122 A | 8/1980 | Shuler |
| 4,439,219 A | 3/1984 | Lambrecht |
| 4,519,823 A | 5/1985 | Kinney, Jr. et al. |
| 4,601,737 A * | 7/1986 | Gerbig ................. B01D 46/002 55/493 |
| 4,737,174 A | 4/1988 | Pontius |
| 5,273,563 A | 12/1993 | Pasch et al. |
| 5,549,723 A | 8/1996 | Terry |
| 6,202,969 B1 | 3/2001 | Orr |
| 7,128,771 B2 | 10/2006 | Harden |
| 7,540,073 B1 * | 6/2009 | Gilstrap ............. B01D 46/0005 24/581.11 |
| 7,607,198 B2 * | 10/2009 | Shimomura ....... B01D 46/0002 16/224 |
| 8,048,186 B2 | 11/2011 | Mann et al. |

(Continued)

FOREIGN PATENT DOCUMENTS

EP 3020462 A1 5/2016

*Primary Examiner* — Minh Chau T Pham
(74) *Attorney, Agent, or Firm* — O'Connell Law Firm; Thomas P. O'Connell

(57) ABSTRACT

A filter retaining mechanism for retaining a filter and a pre-filter in relation to a filter aperture of a filter frame. A base clip retained by a proximal portion of a shank engages a flange of the frame, and a filter/pre-filter clip is retained by a distal portion of the shank. The filter/pre-filter clip has a proximal retaining formation that forms a distal retaining surface of a first reception area for retaining a filter and a proximal retaining surface of a second reception area for retaining a pre-filter and a distal retaining formation that forms a distal retaining surface of the second reception area. The filter/pre-filter clip is pivotable about a longitudinal axis between a first condition wherein the proximal and distal retaining formations retain the filter and the pre-filter and a second condition wherein the proximal and distal retaining formations face away from the filter aperture to release the filter and the pre-filter.

31 Claims, 8 Drawing Sheets

(56) References Cited

U.S. PATENT DOCUMENTS

| | | | |
|---|---|---|---|
| 8,080,079 B2 | 12/2011 | Mahler | |
| 8,105,409 B2* | 1/2012 | Mann | B01D 46/0005 55/483 |
| 8,551,206 B2 | 10/2013 | Cosgrove | |
| 8,673,041 B2* | 3/2014 | Woolard | B01D 46/0005 55/481 |
| 8,747,505 B2* | 6/2014 | Crabtree | B01D 46/0005 55/490 |
| 9,034,068 B2* | 5/2015 | Ball | B01D 46/001 55/483 |
| 2010/0043367 A1* | 2/2010 | Desjardins | B01D 46/0005 55/493 |
| 2010/0139225 A1* | 6/2010 | Mammarella | B01D 46/0001 55/493 |
| 2010/0192528 A1 | 8/2010 | Mann et al. | |
| 2010/0229514 A1* | 9/2010 | Ayshford | B01D 46/0005 55/482 |
| 2010/0251678 A1* | 10/2010 | Mann | F02C 7/052 55/483 |
| 2012/0060454 A1 | 3/2012 | Banks et al. | |
| 2014/0366496 A1 | 12/2014 | Salpietra | |

* cited by examiner

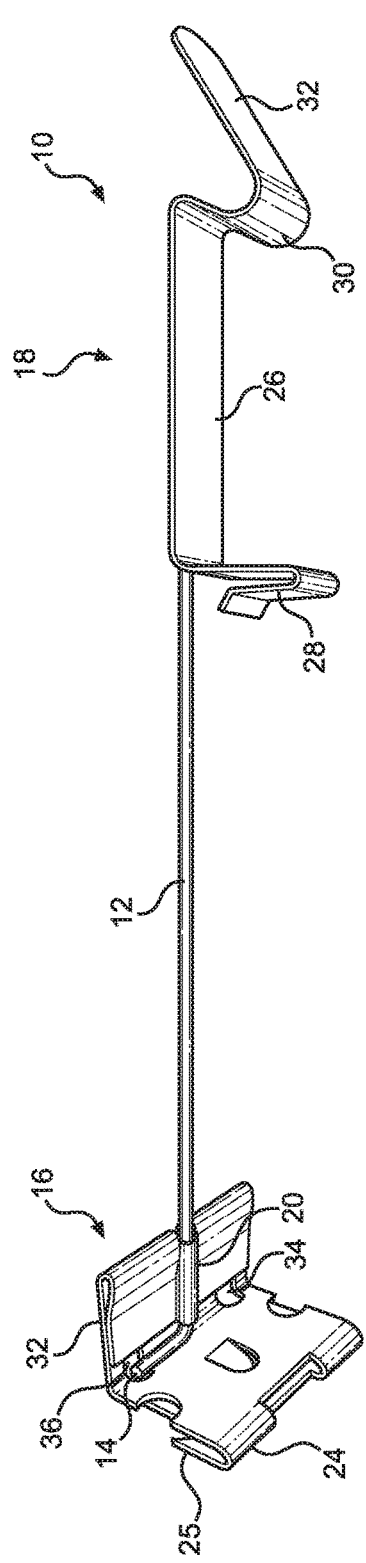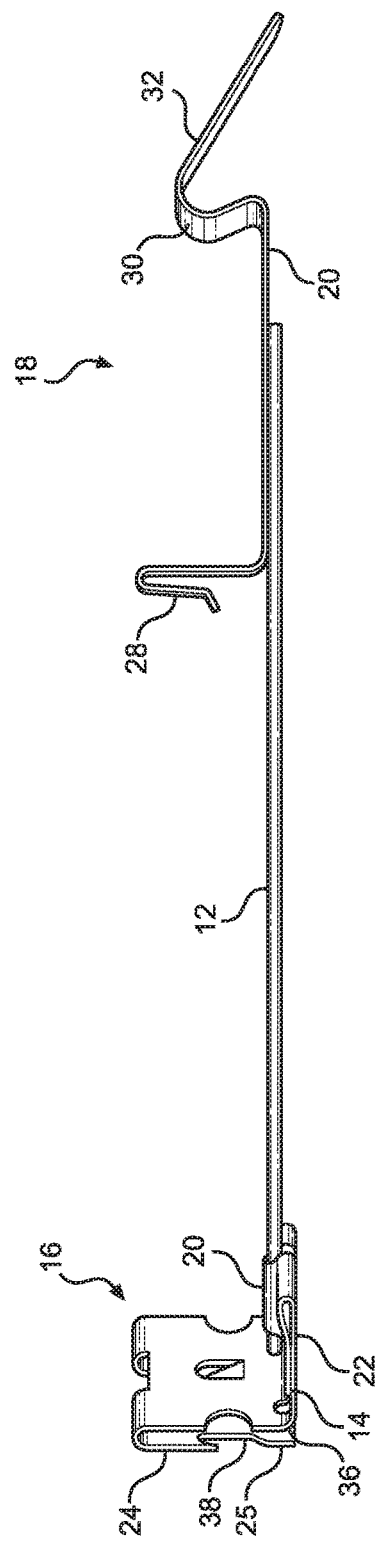

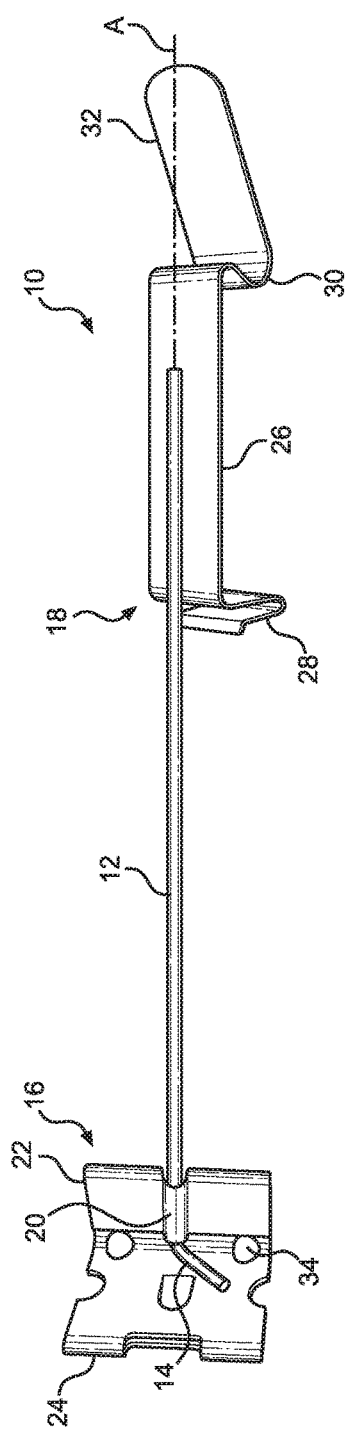
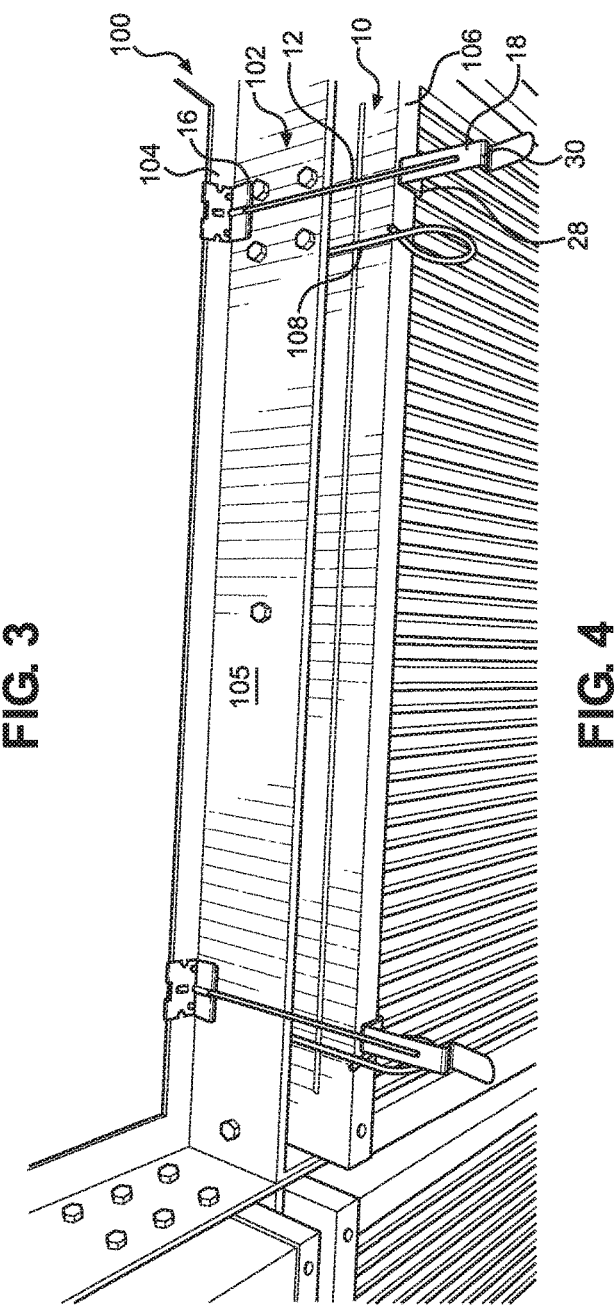
FIG. 3
FIG. 4

US 10,434,449 B1

FILTER RETAINING MECHANISM WITH FILTER/PRE-FILTER CLIP

FIELD OF THE INVENTION

The present invention relates generally to filtration systems for heating, ventilation, and air conditioning. More particularly, disclosed herein is a filter retaining mechanism reconfigurable between a first condition operative to retain a filter assembly comprising a filter and a pre-filter and a second condition permitting removal and replacement of the filter assembly.

BACKGROUND OF THE INVENTION

Proper heating, ventilation, and air conditioning (HVAC) filtration is at the heart of indoor air quality. According to the United States Environmental Protection Agency, unfiltered indoor air is often significantly more polluted than outdoor air. Effective air filtration provides the primary defense against particulate and other pollutants not only to building occupants but also to the HVAC equipment and the building itself.

In large buildings, such as schools and office buildings, atmospheric air will be drawn into the HVAC system and passed through a series of filters disposed upstream of the HVAC system before reaching the occupied spaces of the building. The filters remove contaminants in the air flowing through the HVAC system. The efficiency of a filter determines the contaminants that can be removed by it. For instance, low-efficiency filters may be selected for removing lint and dust from air. Filters of medium and high efficiency can be selected to remove small particulates, such as bacteria, pollen, and soot.

Filters in large building applications are often disposed within filter banks. In filter banks, a filter holding frame holds each filter assembly, and the holding frames are fastened together to form an array of frames retaining an array of filter assemblies. The holding frames typically have sealing flanges extending around the inner periphery of the frame. Each sealing flange, potentially in cooperation with a gasket, abuts the filter assembly to limit the passage of unfiltered air around the filter assembly and through the HVAC system.

Within the filter bank, each filter assembly can include one or multiple filters. For instance, a first-stage filter, or pre-filter, can be retained in an outermost position in the filter assembly. Pre-filters are typically coarse, low-efficiency filters designed to remove large particles and debris. Such pre-filters protect not only building occupants but also the blowers and other mechanical components of the ventilation system from such large particles and debris, but pre-filters are not intended to be effective in removing smaller particles from the air. Instead, one or more secondary filters of higher efficiency must normally be disposed proximal to the pre-filter to remove small particulates.

Within the filter bank, filter assemblies are often retained within their respective holding frames by a plurality of spring clips. The clips can, for instance, be P-shaped spring clips with a loop of the P-shape sprung distally over the outer face of the filter assembly and the leg of the P-shape fastened to the holding frame. The spring clips are designed to tension the filter against the sealing flange of the holding frame. Where a pre-filter is to be used, a second spring clip normally must be used to mount the pre-filter to the filter and to the holding frame.

The need to use multiple, separate clips for final filters and pre-filters creates a cumbersome and mechanically complicated retention system. This is particularly true in the confined spaces with limited accessibility that are common to filter banks. Moreover, the need for plural clips for filters and pre-filters increases the risk of misapplication or malfunction and inadvertent displacement of the filter assembly thereby leading to an influx of raw air into the building structure. As a result, filters and pre-filters can be difficult and cumbersome to retain securely and to insert, remove, and replace. Filters that are difficult to install and handle are often less likely to be applied, tested, and maintained properly and are more prone to malfunction.

Meanwhile, preserving the operating efficiency and effectiveness of the filtration system and preventing failure requires that filters installed in the filter bank be inspected and replaced with suitable frequency. Replacement of a final filter becomes necessary when the resistance to air flow across the filter assembly, commonly measured as pressure drop, becomes unacceptably high. It will be further appreciated that pre-filters and coalescer elements often must be replaced three to four more tires more frequently than final filters. Filters pressed past their useful lives will eventually lead to excessive pressure drop. Pressure drop beyond design parameters overtaxes the HVAC system and risks filter failure and a resultant total loss in filtration.

Accordingly, being able to access, inspect, remove, and replace filters and pre-filters conveniently and efficiently is critical in the field of heating, ventilation, and air conditioning. Despite the filter clips and other retainers provided by the prior art, there remains a need in the art of heating, ventilation, and air conditioning and also in other fields where air filtration is required for a filter retaining mechanism that enables pre-filters and final filters to be retained securely and effectively while permitting filter 1 and replacement quickly and efficiently, ideally without a requirement for special tools.

SUMMARY OF THE INVENTION

The present invention is thus founded on the basic object of providing a filter retaining mechanism capable of selectively retaining a filter assembly comprising a final filter and a pre-filter, such as in relation to a filter frame of a filter rack, in a convenient and effective manner.

A further object of embodiments of the invention is to provide a filter retaining mechanism that is selectively reconfigurable from a first condition operative to retain a filter assembly to a second condition permitting removal and replacement of the filter assembly.

Another particular object of embodiments of the invention is to provide a filter retaining assembly that is selectively reconfigurable manually and without a need for specialized tools.

An underlying object of the invention is to provide a filter retaining mechanism that facilitates and promotes the regular and expeditious inspection, removal, replacement, and overall maintenance f filter assemblies and filtration systems in general.

A further related object of the invention is to provide a filter retaining mechanism that increases filtration system efficiency while reducing system downtime and associated labor and other replacement costs.

These and further objects and advantages of the invention will become obvious not only to one who reviews the present specification and drawings but also to those who have an opportunity to experience an embodiment of the filter retaining mechanism disclosed herein in operation. It will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more objects of the invention, one embodiment of the filter retaining mechanism disclosed herein is operative to selectively retain a filter and a pre-filter in relation to a filter aperture of a filter frame. The filter retaining mechanism has a shank with a proximal portion, a distal portion, and a body portion between the proximal and distal portions. The shank, which can be of any operative cross section and overall shape, has a longitudinal axis. In one illustrative embodiment, the shank can comprise a rod. A base clip, which is configured to engage the filter frame, is retained by the proximal portion of the shank, and a combination filter and pre-filter clip, alternatively referred to as a filter/pre-filter clip, is retained by the distal portion of the shank.

The filter/pre-filter clip defines a distal retaining surface of a first reception area for retaining a filter. The distal retaining surface of the first reception area can cooperate with the base clip or a flange of a filter frame to define the first reception area for the filter. The filter/pre-filter clip further defines a proximal retaining surface and a distal retaining surface of a second reception area for retaining a pre-filter.

The combination filter and pre-filter clip is pivotable about the longitudinal axis in relation to the base clip between a first condition wherein the distal retaining surface of the first reception area, the proximal retaining surface of the second reception area, and the distal retaining surface of the second reception area have a first orientation in relation to the base clip and a second condition wherein the distal retaining surface of the first reception area, the proximal retaining surface of the second reception area, and the distal retaining surface of the second reception area have a second orientation in relation to the base clip different than the first orientation. The first orientation can, for instance, cause the retaining surfaces to face the filter aperture when the filter retaining mechanism is applied to a filter frame, and the second orientation can cause the retaining surfaces to face away from the filter aperture when the filter retaining mechanism is applied to the filter frame.

The filter/pre-filter clip can, for example, be pivotable in relation to the base clip by approximately 180 degrees. In one such embodiment, a leg can project from the proximal portion of the shank generally orthogonally to the longitudinal axis. The base clip can have a lateral wall. The filter/pre-filter clip can be fixed to the shank while the shank is pivotable about the longitudinal axis relative to the base clip. The filter/pre-filter clip and the shank can be pivoted from an orientation wherein the leg contacts the lateral wall to a first side of the longitudinal axis to an orientation wherein the leg contacts the lateral wall to a second side of the longitudinal axis. Furthermore, a relief aperture can be disposed in the lateral wall to the first side of the longitudinal axis and a relief aperture can be disposed in the lateral wall to the second side of the longitudinal axis. The relief apertures can be disposed to receive the leg at the extremes of its pivoting.

It is further contemplated that the base clip can be formed with an end wall and a retaining member retained in spaced relation to the end wall. The end wall and the retaining member are configured such that a flange of the filter frame can be received between the end wall and the retaining member. In one such embodiment, for instance, the retaining member can take the form of a retaining plate disposed in a plane generally parallel to a plane in which the end wall is disposed. With that, the flange of the filter frame can be received between the end wall and the retaining plate.

As disclosed herein, the filter/pre-filter clip can be unitarily formed from a resiliently deflectable material. For example, the filter/pre-filter clip can be formed by a ribbon of spring steel or other resiliently deflectable material bent or otherwise formed to have the disclosed retaining surfaces and formations disclosed herein.

Embodiments of the filter retaining mechanism are disclosed wherein the filter/pre-filter clip has a proximal retaining formation that forms both the distal retaining surface of the first reception area and the proximal retaining surface of the second reception area. The filter/pre-filter clip has a distal retaining formation that forms the distal retaining surface of the second reception area. In one such example, the proximal retaining formation of the filter/pre-filter clip can have a first wall that forms the proximal retaining surface of the second reception area and a second wall spaced from the first wall that forms the distal retaining surface of the first reception area. The first and second walls can, for instance, be connected by a U-shaped overturned segment therebetween, and the first wall can be disposed generally perpendicularly to the longitudinal axis of the shank. Where first and second walls are provided, the second wall can be resiliently deflectable in relation to the first wall. With that, the first reception area will comprise a resilient clamping reception area bounded distally by the second wall of the proximal retaining formation. Still further, the second wall can have an end portion that projects outwardly in relation to the first wall and proximally toward the base clip.

The distal retaining surface of the second reception area and the proximal retaining surface of the second reception area can be relatively resiliently deflectable, such as by having either or both of the proximal retaining surface and the distal retaining surface being resiliently deflectable. With that, the second reception area can be considered to comprise a resilient clamping reception area bounded proximally by the proximal retaining surface of the second reception area and distally by the distal retaining surface of the second reception area. While this could be carried out in a number of ways, one such manifestation of the invention can have the distal retaining formation of the filter/pre-filter clip formed with an arcuate curvature that projects proximally toward the proximal retaining surface of the second reception area. For instance, the distal retaining formation can comprise an S-shaped formation with a base arcuate segment that curves proximally from adjacent to the shank and toward the proximal retaining formation and an outer arcuate segment forming a reverse curve that curves distally away from the proximal retaining formation. The S-shaped formation so formed resiliently deflectable in relation to the proximal retaining formation.

Another particular embodiment of the filter retaining mechanism for retaining a filter and a pre-filter in relation to a filter aperture of a filter frame can be considered to be founded on a shank with a proximal portion, a distal portion, and a body portion between the proximal and distal portions. The shank again has a longitudinal axis. A base clip is retained by the proximal portion of the shank, and a filter/pre-filter clip is retained by the distal portion of the shank. The base clip, which is configured to engage a flange of the filter frame, has an end wall and a retaining member retained in spaced relation to the end wall. With that, a flange of the filter frame can be received between the end wall and the retaining member. The filter/pre-filter clip has a proximal retaining formation that forms both a distal retaining surface of a first reception area for retaining a filter and a proximal retaining surface of a second reception area for retaining a pre-filter. The filter/pre-filter clip further has a distal retaining formation that forms a distal retaining surface of the second reception area.

The filter/pre-filter clip is pivotable about the longitudinal axis in relation to the base clip between a first condition wherein the proximal retaining formation and the distal retaining formation have a first orientation in relation to the base clip and a second condition wherein the proximal retaining formation and the distal retaining formation have a second orientation in relation to the base clip different than the first orientation. For instance, the filter/pre-filter clip can be pivotable in relation to the base clip by approximately 180 degrees from a first orientation wherein the retaining formations face the filter aperture to engage and retain a filter and a pre-filter and a second orientation approximately 180 degrees apart from the first orientation wherein the retaining formations face away from the filter aperture to permit removal and replacement of the filter and the pre-filter.

The filter/pre-filter clip can be fixed in relation to the shank with the shank being pivotable in relation to the base clip. Alternatively, the filter/pre-filter clip could be pivotable in relation to the shank.

Embodiments of the filter retaining mechanism are disclosed wherein the proximal retaining formation of the filter/pre-filter clip has a first wall that forms the proximal retaining surface of the second reception area and a second wall spaced from the first wall that forms the distal retaining surface of the first reception area. The second wall can, for instance, be resiliently deflectable in relation to the first wall. Under such constructions, the first reception area comprises a resilient clamping reception area bounded distally by the second wall of the proximal retaining formation.

Furthermore, the distal retaining surface of the second reception area and the proximal retaining surface of the second reception area can be relatively resiliently deflectable, such as by having either or both retaining surfaces being resiliently deflectable. Under such constructions, the second reception area comprises a resilient clamping reception area for a pre-filter with the resilient clamping reception area bounded proximally by the proximal retaining surface of the second reception area and distally by the distal retaining surface of the second reception area. In one such embodiment, the distal retaining surface of the second reception area is resiliently deflectable. For example, the distal retaining formation of the filter/pre-filter clip can have an arcuate curvature that projects proximally toward the proximal retaining surface of the second reception area. This could be carried out, for instance, by the distal retaining formation having an S-shaped formation. The S-shaped formation can, for example, have a base arcuate segment that curves proximally from adjacent to the shank and toward the proximal retaining formation and an outer arcuate segment forming a reverse curve that curves distally away from the proximal retaining formation. The S-shaped formation is resiliently deflectable in relation to the proximal retaining formation.

The disclosed filter retaining mechanism can be employed to practice a method for retaining a filter and a pre-filter in relation to a filter aperture of a filter frame, such as a filter frame with a sidewall and a peripheral flange at the base of the sidewall. The method can be carried out by disposing the base clip to receive the flange of the filter frame and by disposing the body portion of the shank to overlie the sidewall of the filter frame. With the filter retaining mechanism so disposed, the filter/pre-filter clip can be pivoted to the first condition to cause the filter to be received in the first reception area of the filter/pre-filter clip and the pre-filter to be received in the second reception area of the filter/pre-filter clip. When desired, such as to permit inspection or removal and replacement of the filter or the pre-filter, the filter/pre-filter clip can be pivoted to the second condition to release the filter from the first reception area and to release the pre-filter from the second reception area.

One will appreciate that the foregoing discussion broadly outlines the more important goals and features of the invention to enable a better understanding of the detailed description that follows and to instill a better appreciation of the inventors' contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawing figures:

FIG. 1 is a perspective view of a filter retaining mechanism according to the present invention in a first condition adapted to retain a filter assembly;

FIG. 2 is a view in side elevation of the filter retaining mechanism, again in the first condition;

FIG. 3 is a perspective view of the filter retaining mechanism partially pivoted between the first condition and a second condition permitting removal and replacement of the filter assembly;

FIG. 4 is a perspective view of first and second filter retaining mechanisms positioned within a filter bank in the second condition;

DETAILED DESCRIPTION OF PREFERRED EMBODIMENTS

Figure 5:
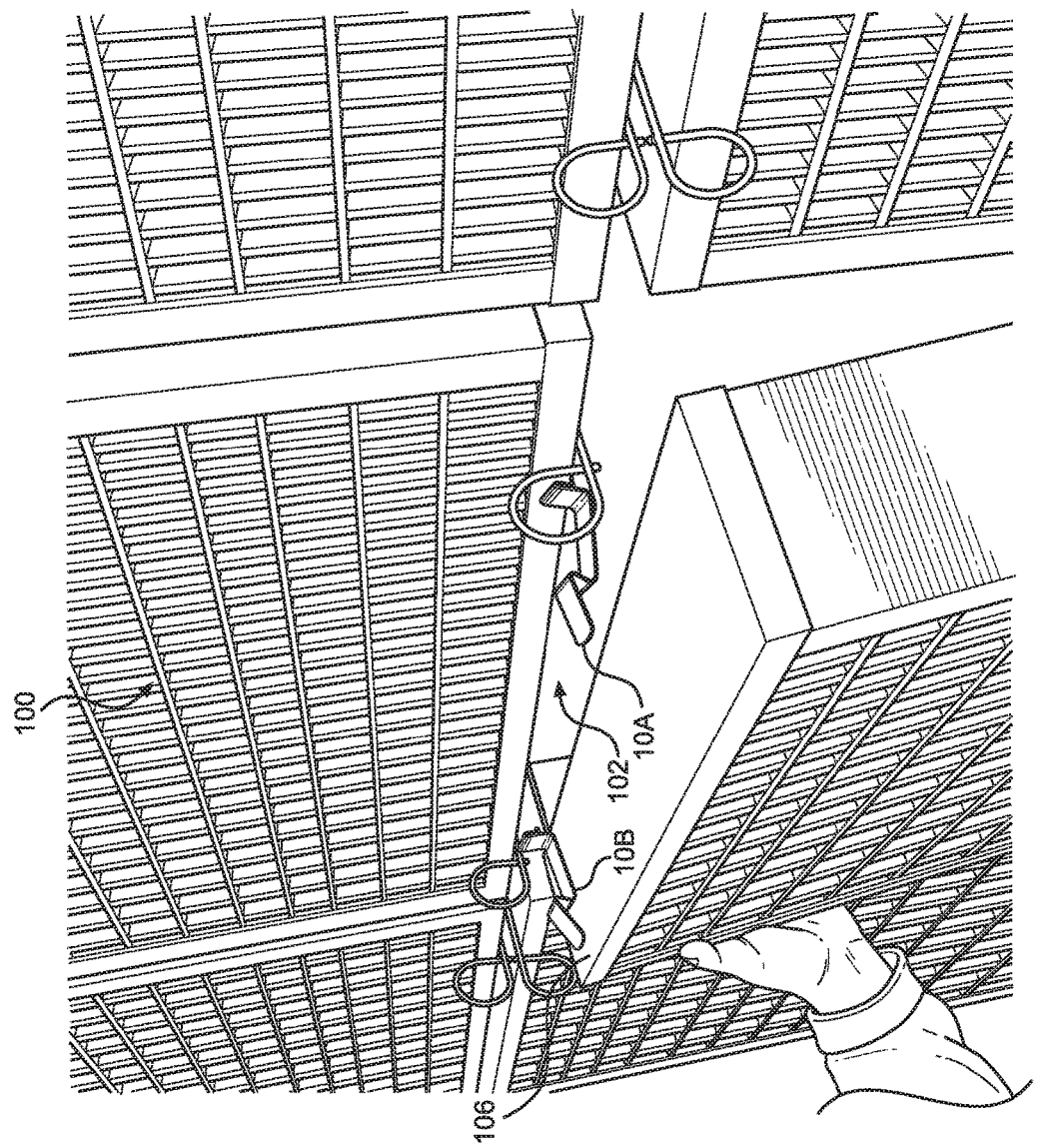
FIG. 5 is a perspective view of first and second filter retaining mechanisms positioned within a filter bank in the second condition during installation of a filter.

The filter retaining mechanism disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Looking more particularly to the drawings, a filter retaining mechanism as taught herein is indicated generally at 10 in FIGS. 1 through 3. There, the filter retaining mechanism 10 can be considered to be founded on an elongate member 12 with a proximal portion, a distal portion, and a body portion between the proximal and distal portions. A base clip 16 is retained by the proximal portion of the elongate member 12, and a combination filter and pre-filter clip 18, which may be referred to as a filter/pre-filter clip 18, is retained by the distal portion of the elongate member 12.

In the depicted embodiment, the elongate member 12 comprises a shank 12 and is formed by an annular rod of material. By way of example and not limitation, the shank 12 could be formed from a rod of metal, such as steel. However, except as expressly provided herein, no structural limitation as to the meaning of the term "shank" is intended apart from comprising a member 12 with the specified proximal portion, distal portion, and body portion. Within the scope of the invention, the shank 12 could be round, flat, or any other cross-sectional shape, and the shank 12 could be formed unitarily or as an assemblage of a plurality of pieces.

The base clip 16 has a lateral wall 22 that is disposed to align with a longitudinal axis A of the shank 12 and an end wall 24 generally orthogonal to the lateral wall 22 and the longitudinal axis A of the shank 12. The shank 12 is retained to pivot about the longitudinal axis A in relation to the base clip 16. In this example, the proximal portion of the shank 12 is pivotally coupled to the base clip 16 by a sleeve 20 that is affixed to or integrally formed with the lateral wall 22. More particularly, the lateral wall 22 is formed with folded-over first and second layers of material. The sleeve 20 is formed by the inner layer of material of the lateral wall 22, and the sleeve 20 and the inner layer of material are truncated to form a channel 36 such that the most proximal end of the shank 12 is exposed at the base of the lateral wall 22 and immediately proximate to the end wall 24.

A lateral leg 14 is disposed at the proximal end of the shank 12. The leg 14 is disposed generally perpendicularly to the longitudinal axis A of the shank 12 and generally parallel to the surface of the end wall 24. Under this construction, the shank 12 can be pivoted 180 degrees about the longitudinal axis A in relation to the base clip 16 from a first orientation as in FIG. 1 where the lateral leg 14 makes contact or near contact with the lateral wall 22 to a first side of the shank 12 to a second orientation where the lateral leg 14 makes contact or near contact with the lateral wall 22 to a second side of the shank 12. Relief apertures 36 are disposed in the lateral wall 22 in alignment with a tip of the lateral leg 14 when the lateral leg 14 and the shank 12 are correspondingly oriented. The apertures 36 permit, among other things, a full 180-degree rotation of the shank 14 and the leg 12 and, consequently, the filter/pre-filter clip 18.

A retaining member comprising a retaining plate 25 is fixed to the outer end of the end wall 24 away from the lateral wall 22. The retaining plate 25 in the depicted embodiment is integrally formed with the end wall 24 and is bent over at the outer end of the end wall 24 to be disposed in a plane generally parallel to a plane in which the end wall 24 is disposed. With that, the retaining plate 25 and the end wall 24 form a clip portion therebetween. Where the end wall 24 and the retaining plate 25 are formed from a resilient material, such as spring steel or any other metal, plastic, or some other resiliently deflectable material, the retaining plate 25 and the end wall 24 can be relatively deflected so that a member, such as a flange 104 of a filter frame 102 can be snugly clipped therebetween. Further, one or more teeth 38 can be formed in either or both of the end wall 24 and the retaining plate 25 to protrude into the clip portion between the end wall 24 and the retaining plate 25. In the depicted embodiment, an inwardly-projecting tooth 38 is formed in the retaining plate 25.

The combination filter/pre-filter clip 18 is retained by a distal portion of the shank 12. The filter/pre-filter clip 18 can, for example, be fixed to the distal portion of the shank 12 as is illustrated, such as by welding, integral formation, mechanical fasteners, or some other method or combination thereof. Except as the invention might be limited by the claims, the filter/pre-filter clip 18 could alternatively be pivotally retained by the shank 12. In either case, the filter/pre-filter clip 18 is pivotable in relation to the base clip 16 and thus in relation to a filter frame 102 to which the filter retaining mechanism 10 is affixed by the base clip 16. The filter/pre-filter clip 18 in this embodiment is unitarily formed from a single strip or ribbon of spring steel or other metal, plastic, or some other resiliently deflectable material and is fixed to the shank 12.

With further reference to FIGS. 9 and 10, which again depict alternative dispositions of the filter retaining mechanism 10 in relation to a filter frame 102, the filter/pre-filter clip 18 retained by the distal portion of the shank 12 has a proximal retaining formation 28 operative to engage and retain both a distal surface of a main filter 106 and a proximal surface of a pre-filter 110 and a distal retaining formation 30 for engaging and retaining a distal surface of the pre-filter 110. A central portion 26 of the filter/pre-filter clip 18 acts as a spine that is retained by the shank 12 to connect and retain the proximal retaining formation 28 and the distal retaining formation 30.

Again with reference to FIGS. 9 and 10, the proximal retaining formation 28 of the filter/pre-filter clip 18 is formed with a first wall 40 that projects orthogonally from the central portion 26 of the clip 18 and generally perpendicularly to the longitudinal axis A of the shank 12. The proximal retaining formation 28 further has a second wall 42 that is overturned in relation to the first wall 40 to be disposed proximal to and generally parallel to the first wall 40 with a U-shaped or V-shaped portion therebetween. In the depicted embodiment, the second wall 40 has an outward, proximally projecting end portion that projects toward the base clip 16. Under this construction, the second wall 42 presents a surface and a structure resiliently deflectable in relation to the first wall 40 and also in relation to the proximal end of the shank 12.

With the resilience provided by the second wall 42, a first resilient clamping reception area is thus defined for retaining a filter 106. The first resilient clamping reception area is bounded distally by the second wall 42 of the proximal retaining formation 28. When the filter retaining mechanism 10 is installed relative to a filter frame 102 as in FIG. 9 where the base clip 16 and the shank 12 are disposed to an opposite side of the sidewall 105 of the filter frame 102 relative to the retained filter 106, the first resilient clamping reception area will be bounded by the flange 104A interior to the respective filter frame 102. Where the filter retaining mechanism 10 is installed relative to a filter frame as in FIG. 10 where the base clip 16 and the shank 12 are disposed to the same side of the sidewall 105 of the filter frame 102 as the filter 106, the first resilient clamping reception area will be bounded by the end wall 24 of the base clip 16.

The distal retaining formation 30 presents a surface and a structure that is resiliently deflectable in relation to the central portion 26 and in relation to the proximal retaining formation 28. More particularly, the distal retaining formation 30 in this embodiment comprises an S-shaped formation that projects generally orthogonally from the central portion 26 and generally perpendicularly to the longitudinal axis A of the shank 12. The S-shaped formation of the distal retaining formation 30 has a base arcuate segment that curves proximally from the central portion 26 and back toward the proximal retaining formation 28, an outer arcuate segment forming a reverse curve that curves distally away from the proximal retaining formation 28, and a segment between the base and outer arcuate segments. Under this construction, the distal retaining formation 30 presents a surface and a structure that is resiliently deflectable in relation to the proximal retaining formation 28 and in relation to the central portion 26. With the resilience provided by the distal retaining formation 30, a second resilient clamping reception area is thus defined between the first wall 40 of the proximal retaining formation 28 and the distal retaining formation 30.

With the first wall 40 and the second wall 42, the proximal retaining formation 28 provides both a distal retaining surface for the first resilient clamping reception area in the form of the second wall 42 and a proximal retaining surface for the second resilient clamping reception area in the form of the first wall 40. It would be possible to have a distal retaining surface for the first resilient clamping reception area and a proximal retaining surface for the second resilient clamping reception area formed by separate formations rather than unitarily by the proximal retaining formation 28 as shown and described. Such a construction is within the scope of the invention except as it might be expressly limited by the claims.

Figure 9:
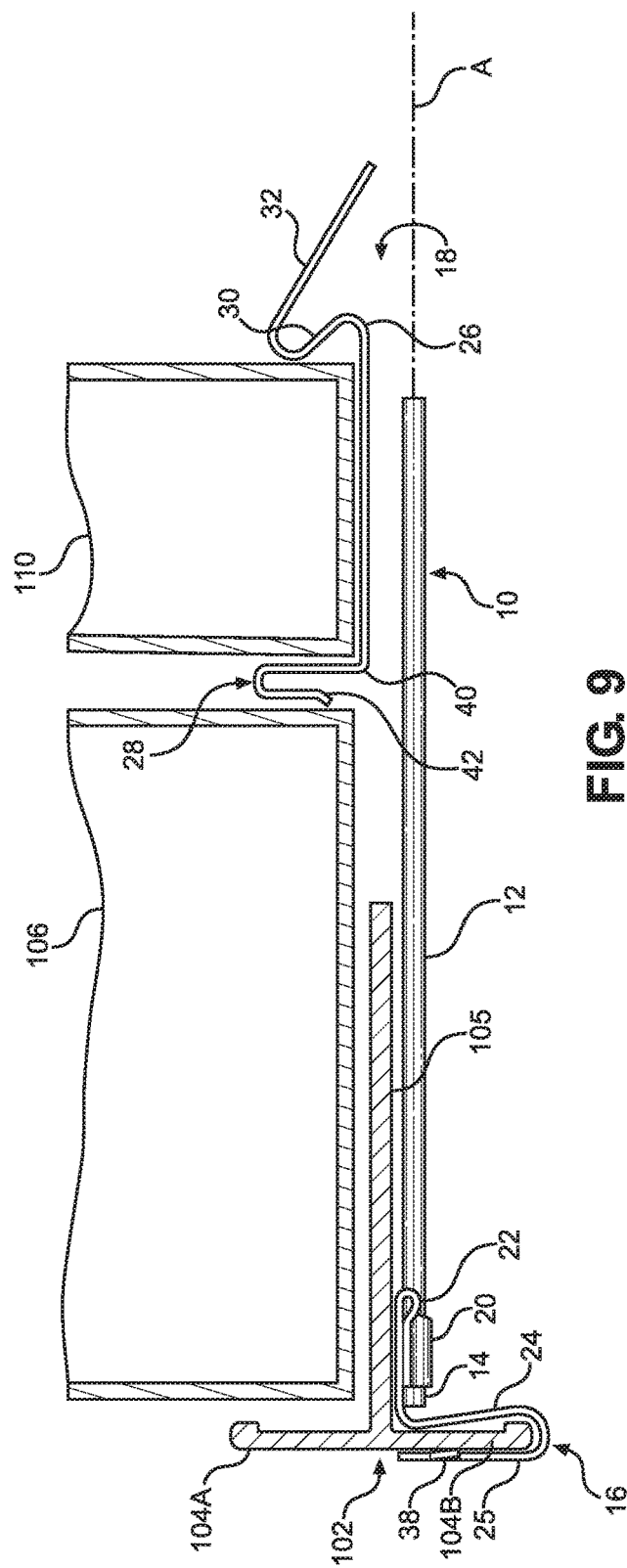
FIG. 9 is a sectioned view in side elevation of a filter and pre-filter retained within a filter frame of a filter bank by a filter retaining mechanism as disclosed herein.
Figure 10:
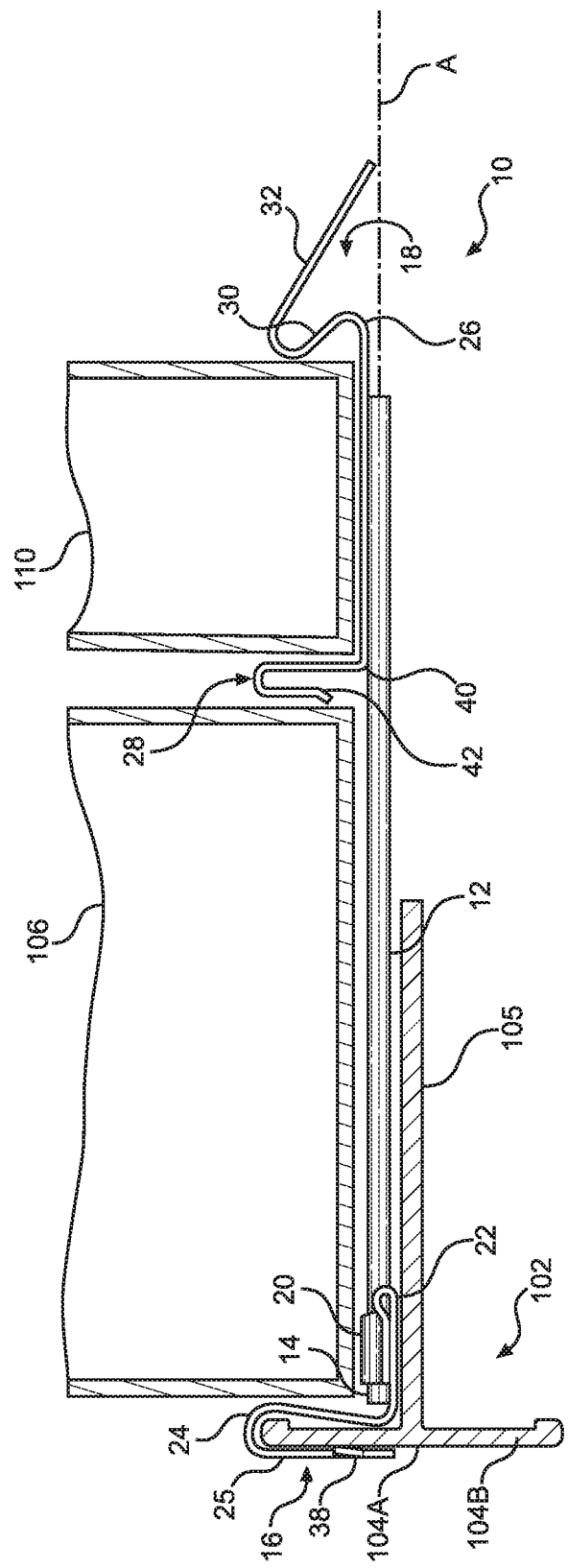
FIG. 10 is a sectioned view in side elevation of an alternative configuration of a filter and pre-filter retained within a filter frame of a filter bank by a filter retaining mechanism as disclosed herein.

A tab 32 extends along a diagonal when viewed in side elevation as in FIGS. 9 and 10 from the outer arcuate segment of the distal retaining formation 30 distally and toward the longitudinal axis A of the shank 12. Here, the tab 32 is formed integrally with the remainder of the filter/pre-filter clip 18, but it could be separately formed within the scope of the invention. The tab 32 can facilitate manipulation of the filter/pre-filter clip 18 and the shank 12 in relation to the base clip 16 and handling of the filter retaining mechanism 10 in general.

In use, one or more filter retaining mechanisms 10 can be applied to a filter frame 102 of a filter bank 100 as shown in FIGS. 4 through 10 to selectively retain a main or final filter 106 and a pre-filter 110. The filter bank 100 could be formed with a single filter frame 102 or with a plurality of filter frames 102 disposed in an array. Each filter frame 102 in a typical filter bank 100 is formed with four sidewalls 105 that cooperate to form a rectangular box defining a filter aperture. A peripheral inboard flange 104A typically extends inwardly and generally perpendicularly from a base of each sidewall 105. Where the filter bank 100 has plural filter frames 102, a peripheral flange 104B of an adjacent filter frame 102 typically extends generally perpendicularly from the base of the sidewall 105 opposite to the flange 104A. As depicted, for instance, in FIG. 8, plural filter retaining mechanisms 10 can be applied to each filter frame 102 of a filter bank 100. For example, first and second pairs of filter retaining mechanisms 10 can be disposed in general opposition to one another in relation to each filter frame 102 thereby to clamp and retain both the main filter 106 and the pre-filter 110 therebetween.

With combined reference to FIGS. 4 through 10, for example, each filter retaining mechanism 10 can be applied to a filter frame 102 by sliding the base clip 16 of the filter retaining mechanism 10 onto a flange 104A or 104B of the filter frame 102 to cause the flange 104A or 104B to be received into the clip portion between the end wall 24 and the retaining plate 25. The tooth or teeth 38 can operate to engage the flange 104A or 104B thereby to fix the filter retaining mechanism 10 in place with the base clip 16 firmly engaged with and retained by the flange 104A or 104B, the shank 12 extending orthogonally to the flange 104A or 104B and across and beyond the filter frame sidewall 105, and the filter/pre-filter clip 18 retained by the shank 12 extending distally to the sidewall 105. The shank 12 extends in close proximity to the sidewall 105 thereby to leave the filter frame 102 substantially unobstructed.

In one retention method as is illustrated in FIG. 9, for instance, the filter retaining mechanism 10 can be applied with the base clip 16 engaged to receive the flange 104B of an adjacent filter aperture such that the shank 12 is retained to the opposite side of the sidewall 105 as the filter 106 and the pre-filter 110 to be retained within the given filter aperture. Alternatively, the filter retaining mechanism 10 can be installed with the base clip 16 engaged to receive the inboard flange 104A of the given filter aperture such that the shank 12 is retained to the same side of the sidewall 105 as the filter 106 and the pre-filter 110 to be retained within that filter aperture as is shown, for example, in FIG. 10.

Figure 6:
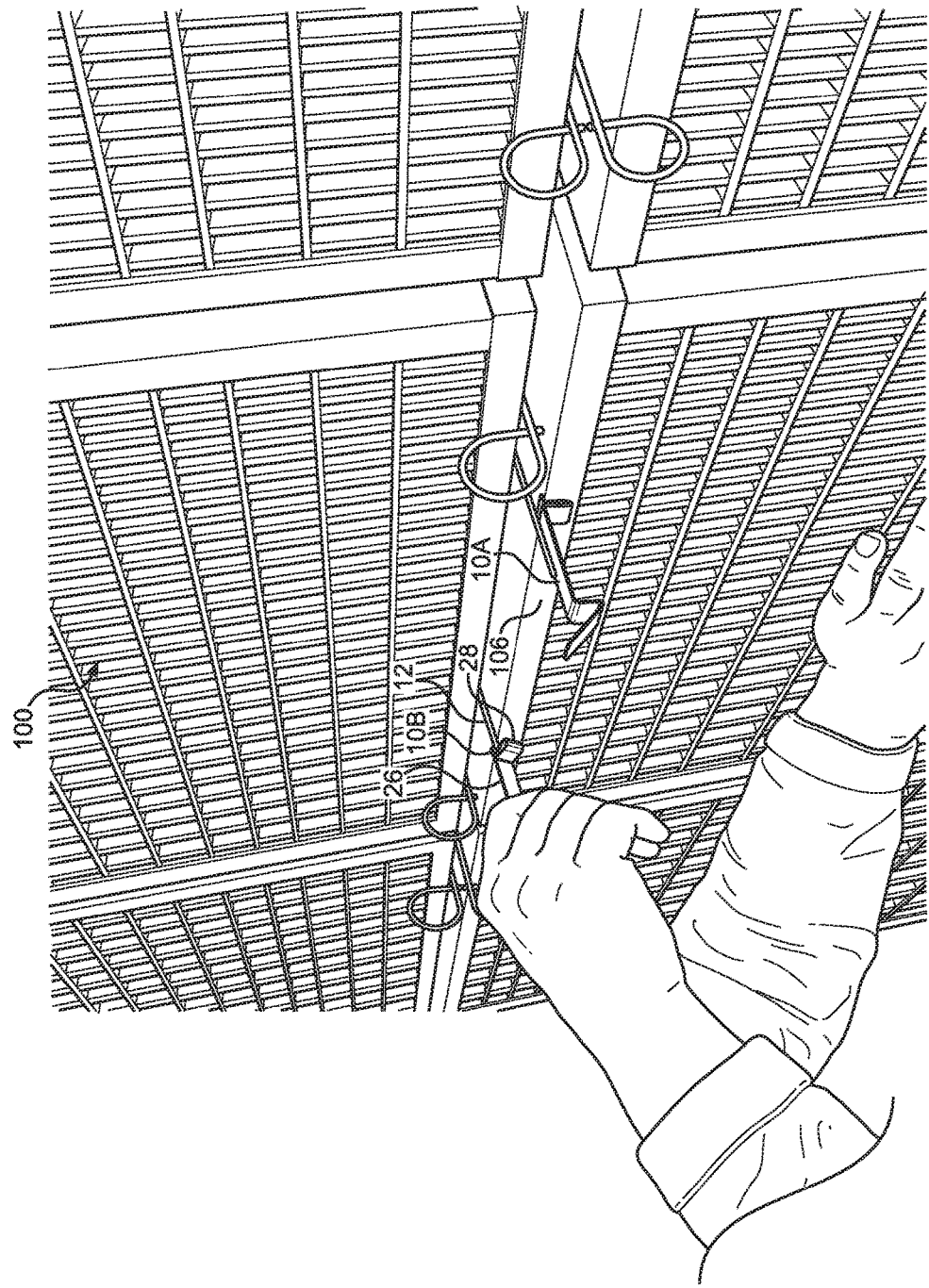
FIG. 6 is a perspective view of first and second filter retaining mechanisms positioned within a filter bank and pivoted to the first condition for retaining the filter.
Figure 7:
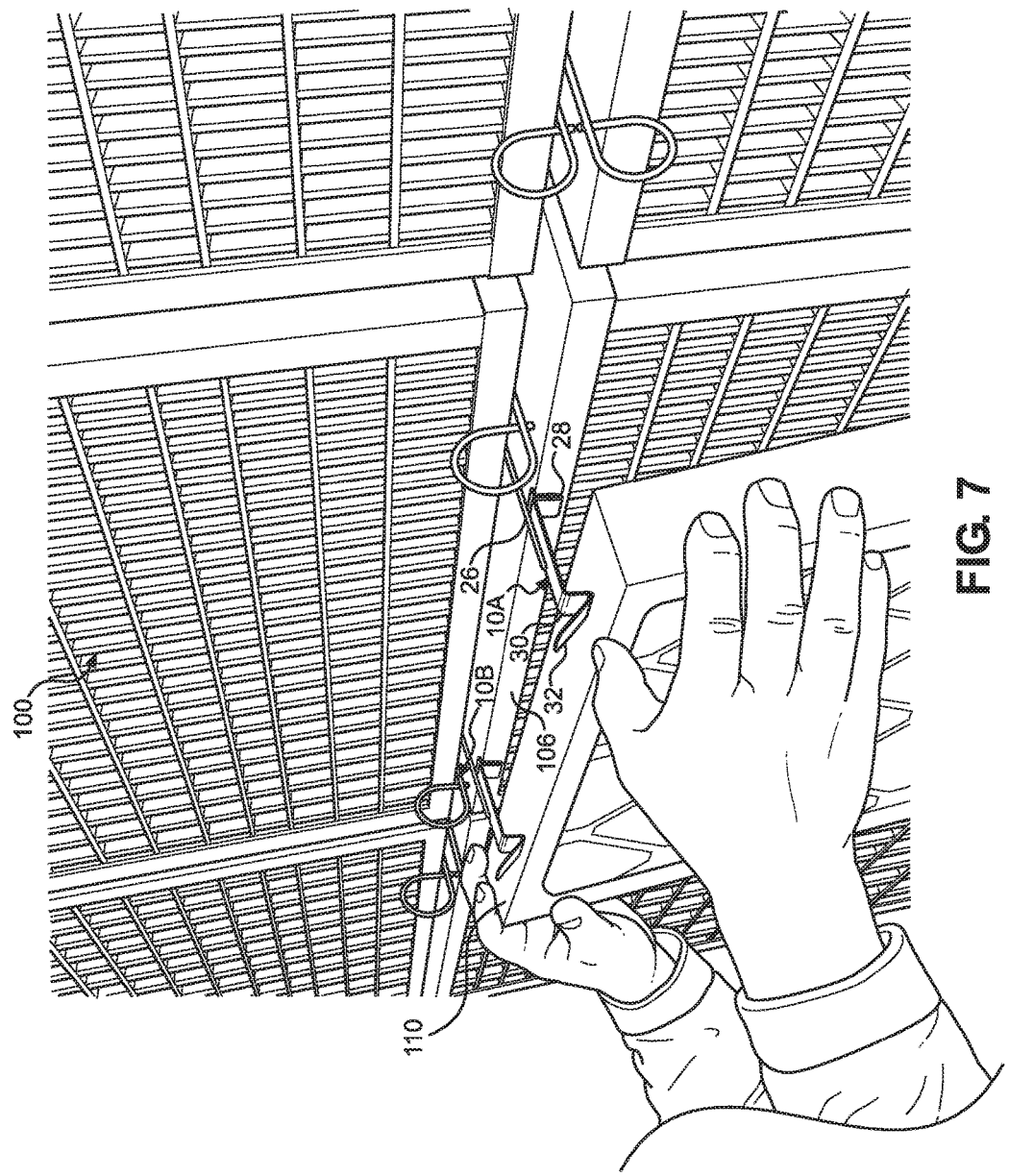
FIG. 7 is a perspective view of first and second filter retaining mechanisms positioned within a filter bank and pivoted to the first condition for retaining the filter and during the installation of a pre-filter.

In either application method, the filter retaining mechanism 10 so disposed can be manipulated as shown in FIG. 6, for example. The filter/pre-filter clip 18, particularly the tab 32 of the filter/pre-filter clip 18, can be gripped and turned to pivot the shank 12 and the retained filter/pre-filter clip 18 about the longitudinal axis A in relation to the base clip 16 and thus in relation to the filter frame 102 where the base clip 16 is fixed to the filter frame 102. By contact with the lateral wall 22, the leg 14 of the shank 12 limits pivoting of the shank 12 and the filter/pre-filter clip 18 to approximately 180 degrees.

Figure 8:
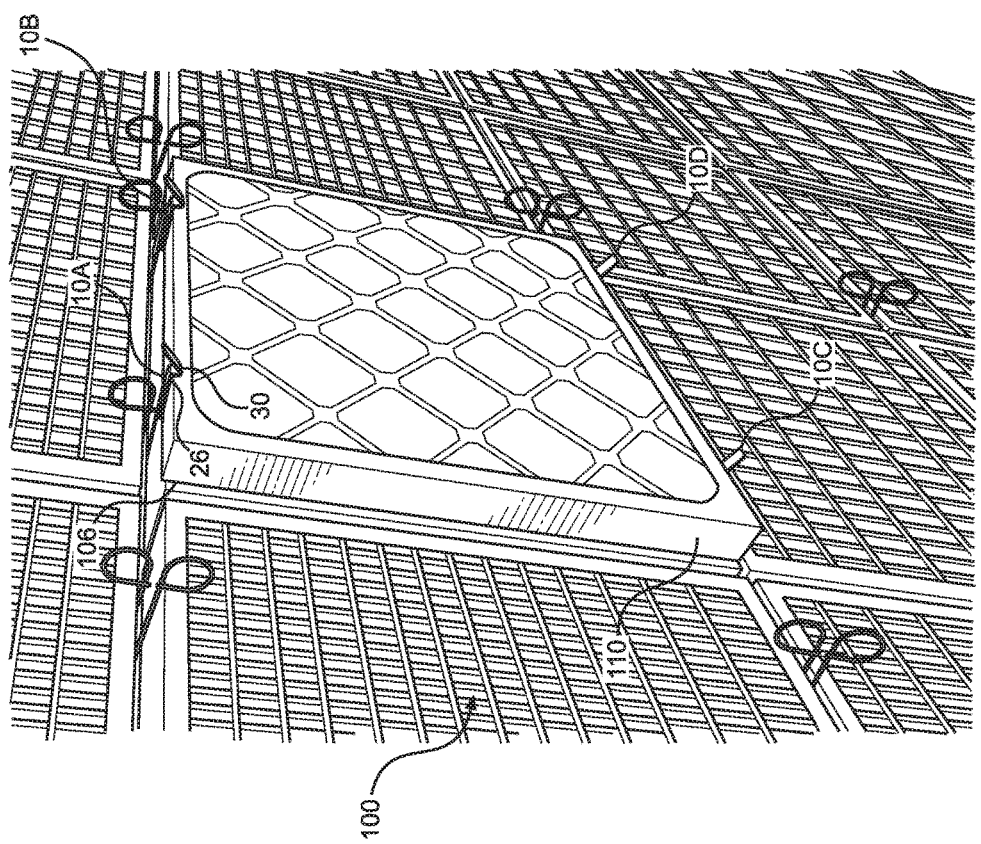
FIG. 8 is a perspective view of a filter and pre-filter retained within a filter bank by a plurality of filter retaining mechanisms.

The filter retaining mechanism 10 has a first condition wherein the leg 14 contacts the lateral wall 22 to a first side of the longitudinal axis A and wherein the filter/pre-filter clip 18 faces inwardly with respect to the respective filter aperture as shown in FIGS. 7 through 10. The filter retaining mechanism 10 has a second condition, pivoted approximately 180 degrees away from the first condition, wherein the leg 14 contacts the lateral wall 22 to a second side of the longitudinal axis A and wherein the filter/pre-filter clip 18 faces outwardly with respect to the respective filter aperture as shown, for instance, in FIGS. 4 and 5. When the filter retaining mechanism 10 is in the first condition, the first resilient clamping reception area can be employed to retain a main filter 106 and the second resilient clamping reception area can be employed to retain a pre-filter 110 in immediate juxtaposition to the filter 106 as FIGS. 8 through 10 illustrate. When the filter 106, the pre-filter 110, or both the filter 106 and the pre-filter 110 are to be accessed, such as for inspection or removal and replacement, the filter/pre-filter clips 18 of the filter retaining mechanisms 10 can be readily pivoted about their longitudinal axes A to the second condition as in FIGS. 4 and 5, for instance, whereby the filter 106 and the pre-filter 110 are freed from the first and second resilient clamping reception areas.

When the filter retaining mechanisms 10 are in the first condition, the filter 106 and the pre-filter 110 are securely retained within the first and second resilient clamping reception areas. When the filter retaining mechanism 10 are in the second condition, the filter 106 and the pre-filter 110 are unrestrained and freely accessible. The filter retaining mechanisms 10 are selectively reconfigurable between the first and second conditions manually, without a need for specialized tools. The filter retaining mechanism 10 thus facilitates and promotes the regular and expeditious inspection, removal, replacement, and overall maintenance of the filter assemblies formed by the filter 106 and the pre-filter 110. Through the ability to be reconfigured between the first, retaining condition and the second, release condition quickly and without a need for tools, the filter retaining mechanisms 10 are capable of increasing filtration system efficiency while reducing system downtime and associated labor and other costs.

With certain details and embodiments of the present invention for a filter retaining mechanism 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventors. Those claims shall be deemed to include equivalent constructions insofar as they do not depart from the spirit and scope of the invention. It must be further noted that a plurality of the following claims may express or be interpreted to express certain elements as means for performing a specific function, at times without the recital of structure or material. As the law demands, any such claims shall be construed to cover not only the corresponding structure and material expressly described in this specification but also all equivalents thereof.

We claim as deserving the protection of Letters Patent:

1. A filter retaining mechanism for retaining a filter and a pre-filter in relation to a filter aperture of a filter frame, the filter retaining mechanism comprising:
    a shank with a proximal end portion, a distal end portion, and a body portion between the proximal and distal end portions wherein the shank has a longitudinal axis;
    a base clip retained by the proximal end portion of the shank, the base clip configured to engage the filter frame;
    a filter/pre-filter clip retained by the distal end portion of the shank;
    wherein the filter/pre-filter clip comprises a distal retaining surface of a first reception area for retaining a filter, a proximal retaining surface of a second reception area for retaining a pre-filter, and a distal retaining surface of the second reception area for retaining a pre-filter;
    wherein the filter/pre-filter clip retained by the distal end portion of the shank is pivotable about the longitudinal axis in relation to the base clip retained by the proximal end portion of the shank between a first condition wherein the distal retaining surface of the first reception area, the proximal retaining surface of the second reception area, and the distal retaining surface of the second reception area have a first orientation in relation to the base clip and a second condition wherein the distal retaining surface of the first reception area, the proximal retaining surface of the second reception area, and the distal retaining surface of the second reception area have a second orientation in relation to the base clip different than the first orientation.

2. The filter retaining mechanism of claim 1 wherein the filter/pre-filter clip is pivotable in relation to the base clip by approximately 180 degrees.

3. The filter retaining mechanism of claim 2 further comprising a leg that projects from the proximal end portion of the shank generally orthogonally to the longitudinal axis, wherein the base clip has a lateral wall, wherein the filter/pre-filter clip is fixed to the shank and the shank is pivotable in relation to the base clip, wherein the filter/pre-filter clip and the shank can be pivoted from an orientation wherein the leg contacts the lateral wall to a first side of the longitudinal axis to an orientation wherein the leg contacts the lateral wall to a second side of the longitudinal axis.

4. The filter retaining mechanism of claim 3 further comprising a relief aperture in the lateral wall to the first side of the longitudinal axis and a relief aperture in the lateral wall to the second side of the longitudinal axis, the relief apertures disposed to receive the leg.

5. The filter retaining mechanism of claim 1 wherein the base clip comprises an end wall and a retaining member retained in spaced relation to the end wall whereby a flange of the filter frame can be received between the end wall and the retaining member.

6. The filter retaining mechanism of claim 5 wherein the retaining member comprises a retaining plate disposed in a plane generally parallel to a plane in which the end wall is disposed.

7. The filter retaining mechanism of claim 1 wherein the filter/pre-filter clip is fixed in relation to the shank.

8. The filter retaining mechanism of claim 7 wherein the shank comprises a rod.

9. The filter retaining mechanism of claim 1 wherein the filter/pre-filter clip is unitarily formed from a resiliently deflectable material.

10. The filter retaining mechanism of claim 1 wherein the filter/pre-filter clip has a proximal retaining formation that comprises the distal retaining surface of the first reception area and the proximal retaining surface of the second reception area and a distal retaining formation that comprises the distal retaining surface of the second reception area.

11. The filter retaining mechanism of claim 10 wherein the proximal retaining formation of the filter/pre-filter clip has a first wall that forms the proximal retaining surface of the second reception area and a second wall spaced from the first wall that forms the distal retaining surface of the first reception area.

12. The filter retaining mechanism of claim 11 wherein the first wall is disposed generally perpendicularly to the longitudinal axis of the shank.

13. The filter retaining mechanism of claim 11 wherein the second wall is resiliently deflectable in relation to the first wall whereby the first reception area comprises a resilient clamping reception area bounded distally by the second wall of the proximal retaining formation.

14. The filter retaining mechanism of claim 13 wherein the second wall has an end portion that projects outwardly in relation to the first wall and proximally toward the base clip.

15. The filter retaining mechanism of claim 10 wherein the distal retaining surface of the first reception area is resiliently deflectable.

16. The filter retaining mechanism of claim 10 wherein the distal retaining surface of the second reception area and the proximal retaining surface of the second reception area are relatively resiliently deflectable whereby the second reception area comprises a resilient clamping reception area bounded proximally by the proximal retaining surface of the second reception area and distally by the distal retaining surface of the second reception area.

17. The filter retaining mechanism of claim 16 wherein the distal retaining surface of the second reception area is resiliently deflectable.

18. The filter retaining mechanism of claim 17 wherein the distal retaining formation of the filter/pre-filter clip has an arcuate curvature that projects proximally toward the proximal retaining surface of the second reception area.

19. The filter retaining mechanism of claim 18 wherein the distal retaining formation comprises an S-shaped formation with a base arcuate segment that curves proximally from adjacent to the shank and toward the proximal retaining formation and an outer arcuate segment forming a reverse curve that curves distally away from the proximal retaining formation wherein the S-shaped formation is resiliently deflectable in relation to the proximal retaining formation.

20. A filter retaining mechanism for retaining a filter and a pre-filter in relation to a filter aperture of a filter frame, the filter retaining mechanism comprising:
a shank with a proximal end portion, a distal end portion, and a body portion between the proximal and distal end portions wherein the shank has a longitudinal axis;
a base clip retained by the proximal end portion of the shank, the base clip configured to engage a flange of the filter frame, wherein the base clip comprises an end wall and a retaining member retained in spaced relation to the end wall whereby a flange of the filter frame can be received between the end wall and the retaining member;
a filter/pre-filter clip retained by the distal end portion of the shank wherein the filter/pre-filter clip has a proximal retaining formation that forms a distal retaining surface of a first reception area for retaining a filter and a proximal retaining surface of a second reception area for retaining a pre-filter and wherein the filter/pre-filter clip has a distal retaining formation that forms a distal retaining surface of the second reception area for retaining a pre-filter;
wherein the filter/pre-filter clip is pivotable about the longitudinal axis in relation to the base clip retained by the proximal end portion of the shank between a first condition wherein the proximal retaining formation and the distal retaining formation have a first orientation in relation to the base clip and a second condition wherein the proximal retaining formation and the distal retaining formation have a second orientation in relation to the base clip different than the first orientation.

21. The filter retaining mechanism of claim 20 wherein the filter/pre-filter clip is pivotable in relation to the base clip by approximately 180 degrees.

22. The filter retaining mechanism of claim 20 wherein the filter/pre-filter clip is fixed in relation to the shank and the shank is pivotable in relation to the base clip.

23. The filter retaining mechanism of claim 20 wherein the proximal retaining formation of the filter/pre-filter clip has a first wall that forms the proximal retaining surface of the second reception area and a second wall spaced from the first wall that forms the distal retaining surface of the first reception area.

24. The filter retaining mechanism of claim 23 wherein the second wall is resiliently deflectable in relation to the first wall whereby the first reception area comprises a resilient clamping reception area bounded distally by the second wall of the proximal retaining formation.

25. The filter retaining mechanism of claim 20 wherein the distal retaining surface of the first reception area is resiliently deflectable.

26. The filter retaining mechanism of claim 20 wherein the distal retaining surface of the second reception area and the proximal retaining surface of the second reception area are relatively resiliently deflectable whereby the second reception area comprises a resilient clamping reception area bounded proximally by the proximal retaining surface of the second reception area and distally by the distal retaining surface of the second reception area.

27. The filter retaining mechanism of claim 26 wherein the distal retaining surface of the second reception area is resiliently deflectable.

28. The filter retaining mechanism of claim 27 wherein the distal retaining formation of the filter/pre-filter clip has an arcuate curvature that projects proximally toward the proximal retaining surface of the second reception area.

29. The filter retaining mechanism of claim 28 wherein the distal retaining formation comprises an S-shaped formation with a base arcuate segment that curves proximally from adjacent to the shank and toward the proximal retaining formation and an outer arcuate segment forming a reverse curve that curves distally away from the proximal retaining formation wherein the S-shaped formation is resiliently deflectable in relation to the proximal retaining formation.

30. A method for retaining a filter and a pre-filter in relation to a filter aperture of a filter frame that has a sidewall and a flange by use of at least one of the filter retaining mechanisms of claim 20, the method comprising disposing the base clip to receive the flange of the filter frame and the body portion of the shank disposed to overlie the sidewall of the filter frame, pivoting the filter/pre-filter clip to the first condition to cause the filter to be received in the first reception area of the filter/pre-filter clip and the pre-filter to be received in the second reception area of the filter/pre-filter clip.

31. The method of claim 30 further comprising pivoting the filter/pre-filter clip to the second condition to release the filter from the first reception area and the pre-filter from the second reception area.

* * * * *